US008286521B2

(12) United States Patent
McIlroy et al.

(10) Patent No.: US 8,286,521 B2
(45) Date of Patent: Oct. 16, 2012

(54) CONTROL PANEL ACTUATOR DEVICE

(75) Inventors: Timothy C. McIlroy, Liverpool, NY (US); David J. Carta, Baldwinsville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 770 days.

(21) Appl. No.: 12/411,465

(22) Filed: Mar. 26, 2009

(65) Prior Publication Data

US 2010/0242645 A1 Sep. 30, 2010

(51) Int. Cl.
*F16H 25/44* (2006.01)
*F16H 21/54* (2006.01)
*F16H 25/18* (2006.01)

(52) U.S. Cl. .......................... 74/104; 74/103; 200/50.01

(58) Field of Classification Search .................. 74/99 R, 74/103, 104; 200/50.01, 17 R, 330, 51 R, 200/331, 332.1
See application file for complete search history.

(56) References Cited

U.S. PATENT DOCUMENTS 2,376,506 A * 5/1945 Robbins ...................... 200/17 R
3,179,396 A 4/1965 Bracken
3,484,090 A 12/1969 Mahoney
4,019,166 A 4/1977 Lawrence et al.
4,166,939 A 9/1979 Switzer
4,692,572 A 9/1987 Heath
5,066,840 A 11/1991 Wiktor et al.
5,475,190 A 12/1995 Smith et al.
5,552,647 A 9/1996 Tinkham
5,762,180 A 6/1998 Pomatto et al.
6,031,301 A 2/2000 Callahan et al.
6,288,348 B1 9/2001 Eberts et al.
6,706,984 B1 3/2004 Turner
6,714,106 B1 3/2004 Czarnecki et al.
6,797,903 B1 9/2004 Winslett et al.
2005/0194243 A1 9/2005 Prineppi

FOREIGN PATENT DOCUMENTS

GB 2149214 A 6/1985
GB 2206739 A 1/1989

* cited by examiner

*Primary Examiner* — Justin Krause
(74) *Attorney, Agent, or Firm* — Howard IP Law Group, P.C.

(57) ABSTRACT

An actuator assembly for remote actuation of control panel components in an environment that restricts human access is contemplated. The actuator assembly includes one or more remotely controllable linear drive mechanisms for imparting a rotation motion on one or more cams to remotely press a control panel component such as a button or switch. While disengaged, the cams are rotated to a position where they minimally obstruct an operator's view. The actuator assembly also allows the force and throw of actuation to be accurately controlled.

12 Claims, 7 Drawing Sheets

CONTROL PANEL ACTUATOR DEVICE

FIELD OF THE INVENTION

The present invention relates generally to the field of control panels and particularly to a device for providing remote actuation of control panel control components.

BACKGROUND

The problem of mechanically actuating a control component on a control panel located in an environment that restricts human access often arises. One problem arises with control panels located in test chambers used in stress and environmental equipment testing. Current devices include manual and automated linear drive mechanisms that incorporate plungers for directly pressing control panel components such as buttons or rocker switches. While such devices are capable of performing remote actuation they fail to provide significant visual feedback to the remote operator during operation of the equipment. Furthermore, such devices fail to adequately control the actuation during operation. Failure to provide precise control of the force of actuation may result in damage to the control panel. Alternative systems are desired.

SUMMARY OF INVENTION

An actuator assembly for remote actuation of control panel components in an environment that restricts human access includes one or more remotely controllable linear drive mechanisms for imparting a rotation motion on one or more cams to remotely press a control panel component such as a button or switch. While disengaged, the cams are rotated to a position where they minimally obstruct an operator's view. The actuator assembly also allows the force and throw of actuation to be accurately controlled.

DETAILED DESCRIPTION

Reference will now be made in detail to the present exemplary embodiments of the invention, examples of which are illustrated in the accompanying drawings.

Figure 1:
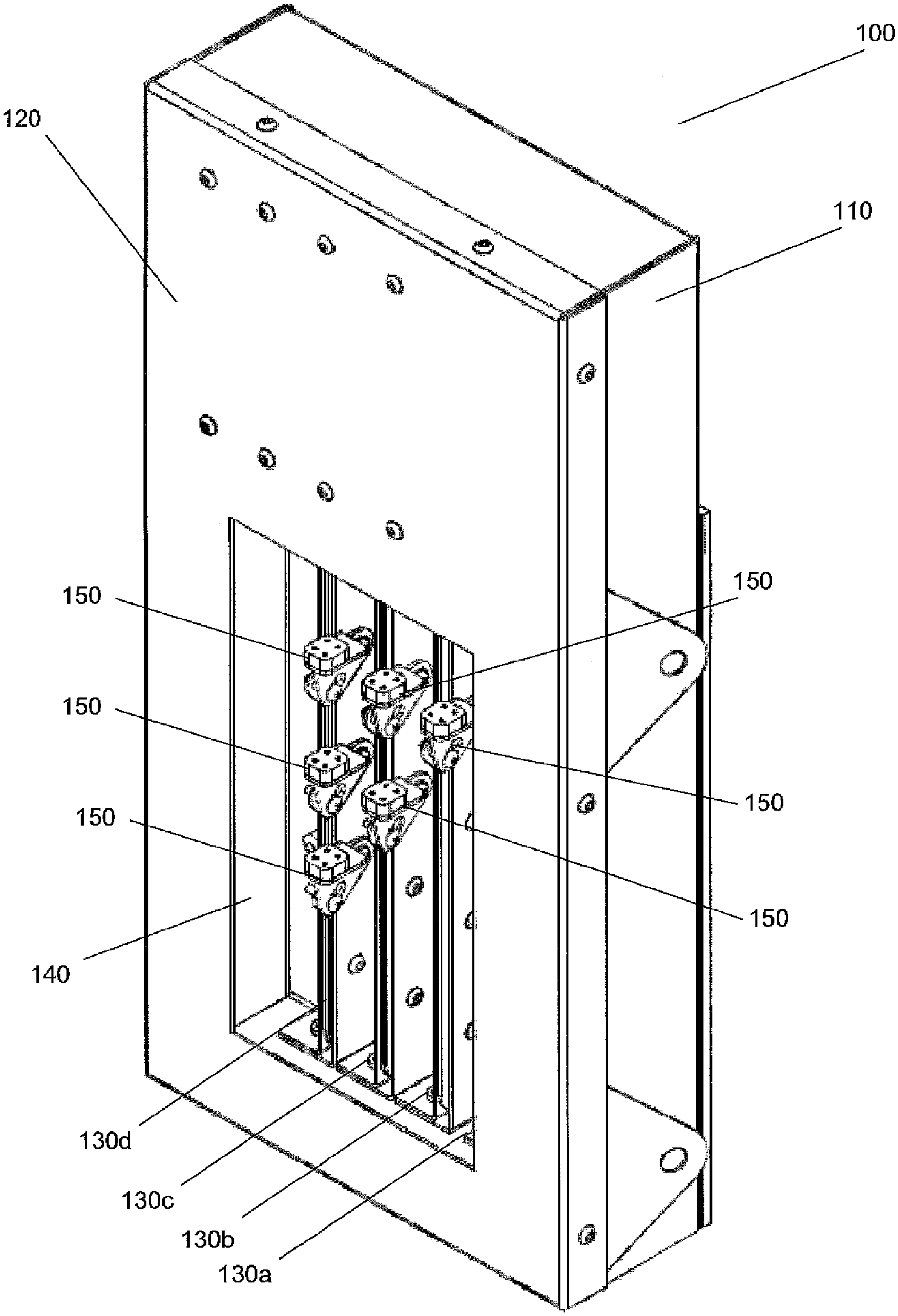
FIG. 1 is a diagram illustrating an isometric view of an actuator assembly in accordance with an exemplary embodiment of the invention.

Referring to FIG. 1, a diagram is shown illustrating an isometric view of an actuator assembly 100 in accordance with an exemplary embodiment of the invention. As shown, the exemplary actuator assembly 100 comprises an actuator assembly housing 110 and actuator assembly cover 120. The actuator assembly 100 further comprises one or more actuators labeled as 130*a* (partially shown), 130*b*, 130*c* and 130*d* housed substantially within the actuator housing 110. Each actuator 130*a*, 130*b*, 130*c* and 130*d* includes one or more cams labeled generally as 150. The actuator assembly 100 is adapted to be removably mounted to a control panel (not shown) having for example one or more buttons or rocker switches. The cams 150 are configured to press one of the buttons or rocker switches on the control panel when in an engaged state. It is to be understood that while four actuators are shown, the actuator assembly may include more or fewer actuators depending on the configuration of the control panel to which the actuator assembly 100 is mounted. The actuator assembly cover 120 includes a cutout section 140 for allowing the control panel to remain visible to an operator during use. By way of example only, the actuator assembly 100 may be approximately 16 inches in height, 8 inches in width and 3 inches in depth. The actuator housing 110 and actuator assembly cover may be comprised of laser cut stainless steel. By way of example only, the actuator assembly 100 has application in environments that are hostile to typical human interaction and environments that restrict human access. Such hostile environments and conditions for application of embodiments of the present invention include but are not limited to radiation, fluid, or weather-related hostile conditions. By way of further example, the assembly may operate in environments whose temperatures may range from −25 degrees Celsius to +55 degrees Celsius, and/or have humidity ranging up to 90% humidity. The actuator assembly 100 will now be discussed in greater detail with reference to FIG. 2A and FIG. 2B.

Figure 2B:
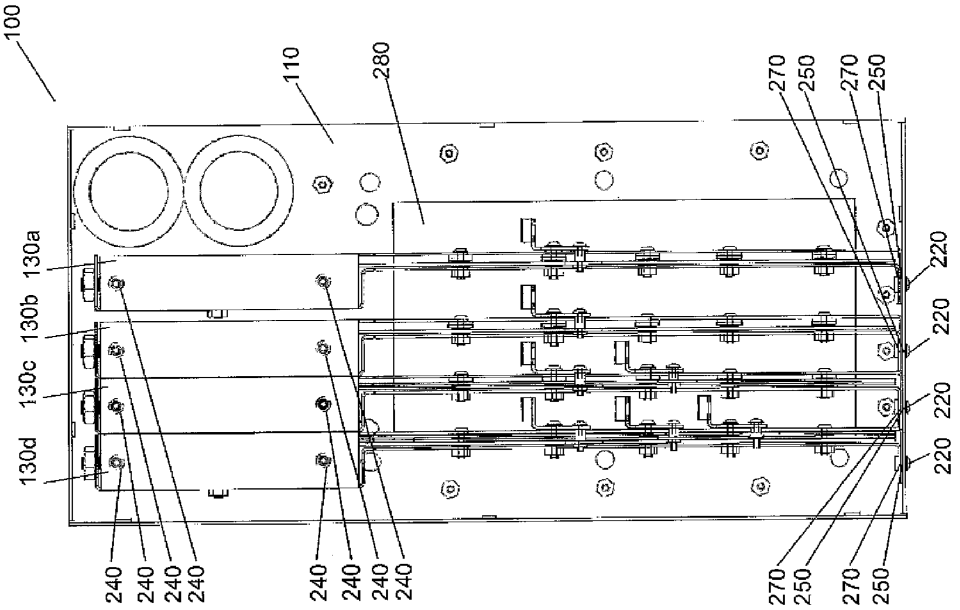
FIG. 2B is a diagram illustrating another front view of the exemplary actuator assembly of FIG. 1.
Figure 2A:
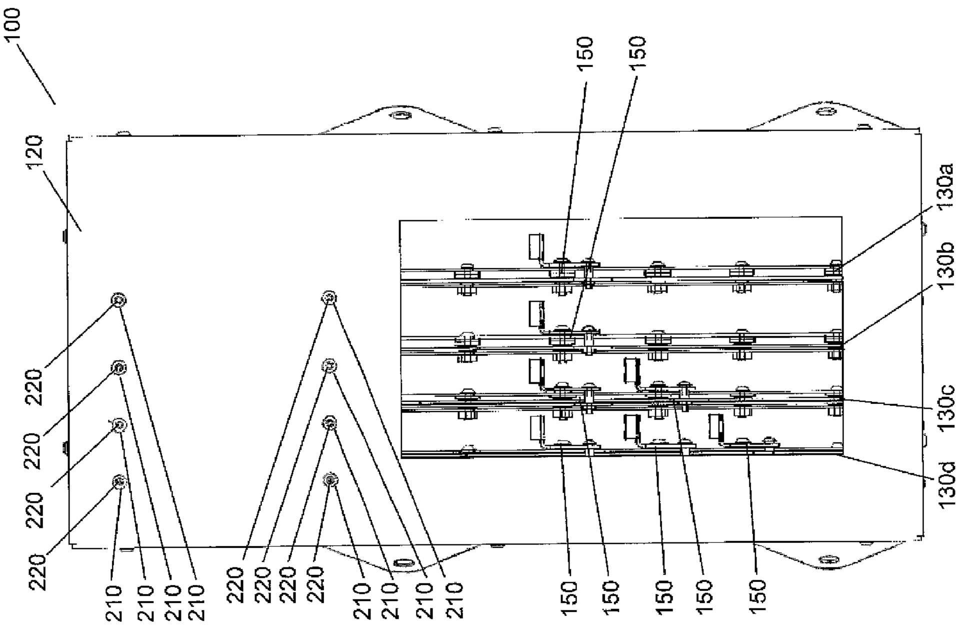
FIG. 2A is a diagram illustrating a front view of the exemplary actuator assembly of FIG. 1.

Referring now to FIG. 2A and FIG. 2B, diagrams are shown illustrating a front view of the exemplary actuator assembly 100 of FIG. 1. FIG. 2A shows the actuator assembly 100 with the actuator assembly cover 120 attached while FIG. 2B shows the actuator assembly 100 with the actuator assembly cover 120 removed. The actuator assembly cover 120 includes a plurality of circular cutouts labeled generally as 210 which are sized to receive attachment mechanisms, such as screws, labeled generally as 220. The attachment mechanisms 220 provide a means for removably coupling the actuators 130*a*, 130*b*, 130*c* and 130*d* to the actuator assembly cover 120. The circular cutouts 210 are positioned to mate with a corresponding set of holes labeled generally as 240 located on the front surface of the actuators 130*a*, 130*b*, 130*c* and 130*d*. The holes 240 may be configured as threaded holes to receive the attachment mechanisms 220. The plurality of circular cutouts 210 may alternately be sized as slots to allow the actuators to be adjusted in a lateral direction. In the alternate embodiment the attachment mechanisms 220 may be wing screws. The actuator assembly housing 110 includes a plurality of circular cutouts labeled generally as 250 which are also sized to receive attachment mechanisms 220. The attachment mechanisms 220 provide a means for removably coupling the actuators 130*a*, 130*b*, 130*c* and 130*d* to the actuator assembly housing 110. The circular cutouts 250 are positioned to mate with a corresponding set of holes labeled generally as 270 located on a bottom surface of the actuators 130*a*, 130*b*, 130*c* and 130*d*. The holes 270 may be configured as threaded holes to receive the attachment mechanisms 220. The plurality of circular cutouts 250 may alternately be sized as slots to allow the actuators to be adjusted in a lateral direction. The back surface of the actuator assembly housing 110 includes an additional set of circular cutouts (not shown) sized to receive another set of attachment mechanisms 220. The attachment mechanisms 220 provide an additional means for removably coupling the actuators 130*a*, 130*b*, 130*c* and 130*d* to the actuator assembly housing 110. The circular cutouts are positioned to mate with a corresponding set of holes (not shown) located on the back surface of the actuators 130*a*, 130*b*, 130*c* and 130*d*, opposite the holes 240 shown on the front surface of the actuators 130*a*, 130*b*, 130*c* and 130*d*. The plurality of circular cutouts on the back surface of the actuator assembly housing 110 may alternately be sized as slots to allow the actuators 130*a*, 130*b*, 130*c* and 130*d* to be adjusted in a lateral direction. The back surface of the actuator assembly housing 110 also includes a cutout section 280 for allowing the cams to engage the buttons or switches located on the control panel to which the actuator assembly 100 is mounted.

Figure 3A:
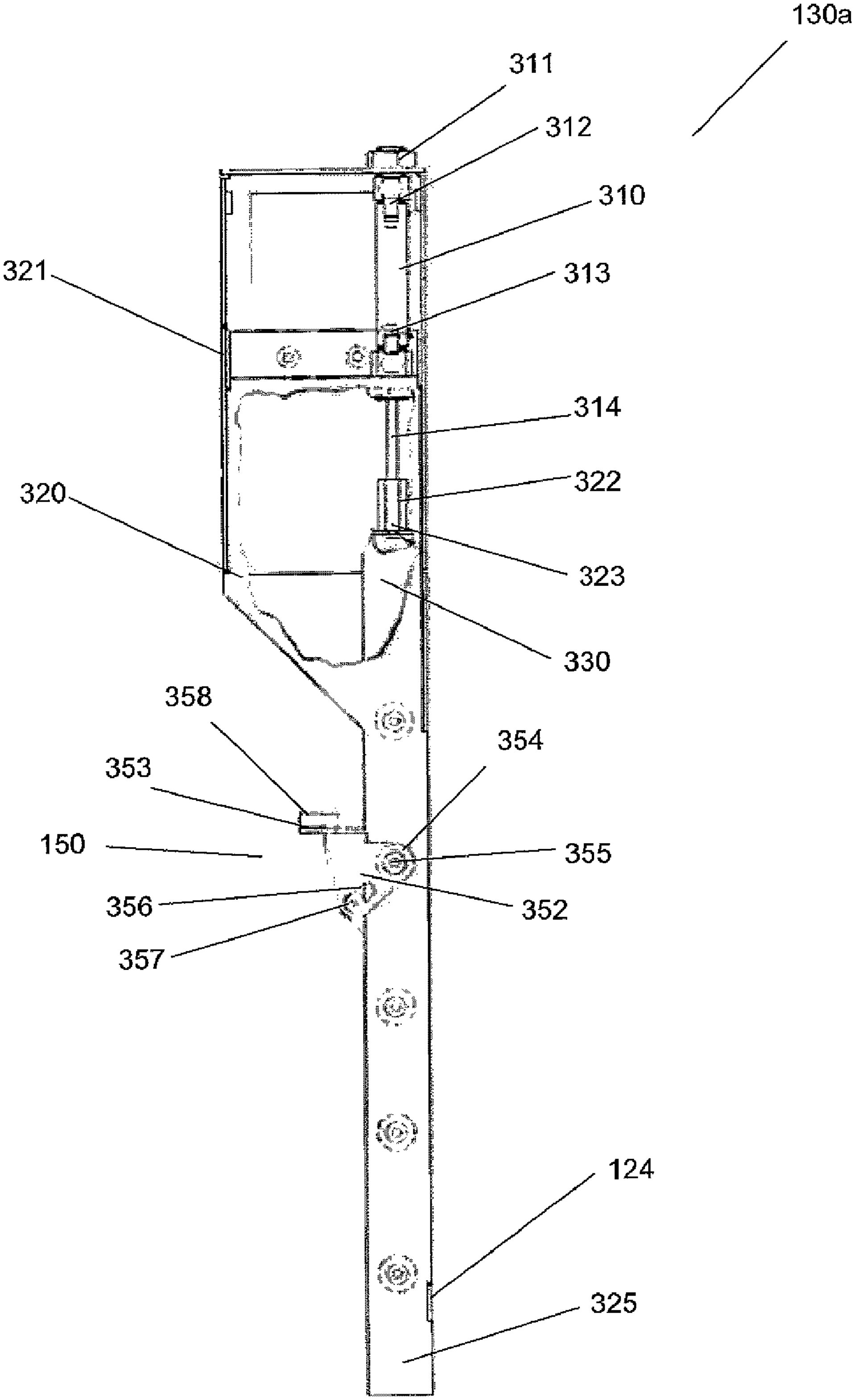
FIG. 3A is a diagram illustrating a side view of an actuator in accordance with the exemplary actuator assembly of FIG. 1.

Referring now to FIG. 3A, a diagram is shown illustrating a side view of the exemplary actuator 130*a* in accordance with the actuator assembly 100 of FIG. 1. As shown, the exemplary actuator 130*a* includes a drive mechanism 310, an actuator housing 320, a slider component 330 and one or more cams 150. It is noted that while the exemplary actuator 130*a* shows a single cam 150, the exemplary actuator may be configured to employ additional cams. The actuator housing includes an upper section 321 that substantially houses the drive mechanism 310. The actuator housing 320 may be comprised of laser cut stainless steel. By way of example only, the drive mechanism 310 may be a pneumatic linear drive mechanism such as a Bimba 0071-DXP-N double acting air cylinder. The drive mechanism 310 may be remotely controlled by a computer capable of generating pneumatic instructions. In an alternate embodiment, the drive mechanism may be a solenoid drive. A solenoid drive may be employed to allow the contemplated actuator assembly 100 to operate in a low pressure environment such as a vacuum. The drive mechanism may include a nut 311 for coupling the drive mechanism 310 to the actuator housing 320. The drive mechanism 310 may also include an output port 312 and an input port 313 for releasing and taking in air respectively, and an axially moveable rod 314 for providing linear motion to the slider component 330. A hex nut 322 attaches to the lower end of the axially moveable rod and a screw 323 is then provided for attaching the slider component 330 to the drive mechanism 310 inserting into the hex nut 322. Each of the cams 150 include a cam body 352 having a contact section 353 to which a cam padding 358 may be attached. Each cam body 352 includes a first circular cutout section 354 through which an attachment mechanism 355 may be inserted to rotatably couple the cam 150 to the actuator housing 320. Each cam body 352 also has a slot-shaped cutout 356 through which another attachment mechanism 357 may be inserted to slidably couple the cam 150 to the slider component 330. By way of example only, the actuator 130*a* may be approximately 16 inches in height, 2.5 inches in width, and 1 inch in depth. The slider component 330 may be approximately 11 inches in height, 0.6 inches in width and 1 inch in depth. The slider may be comprised of laser cut stainless steel.

Figure 3B:
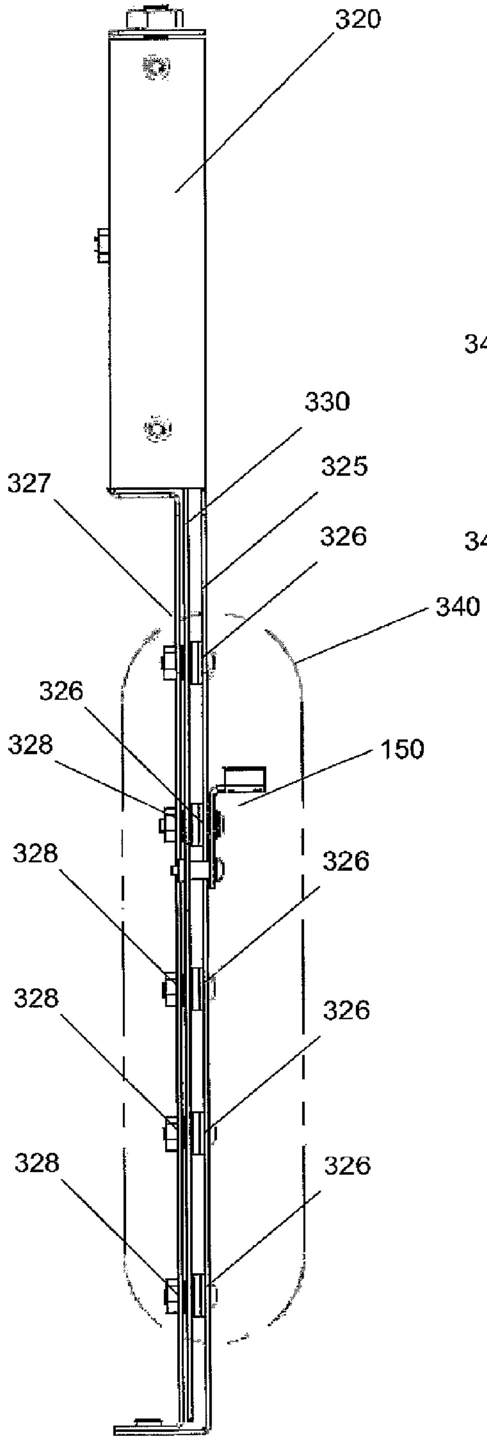
FIG. 3B is a diagram illustrating a front view of the exemplary actuator of FIG. 3A.
Figure 3C:
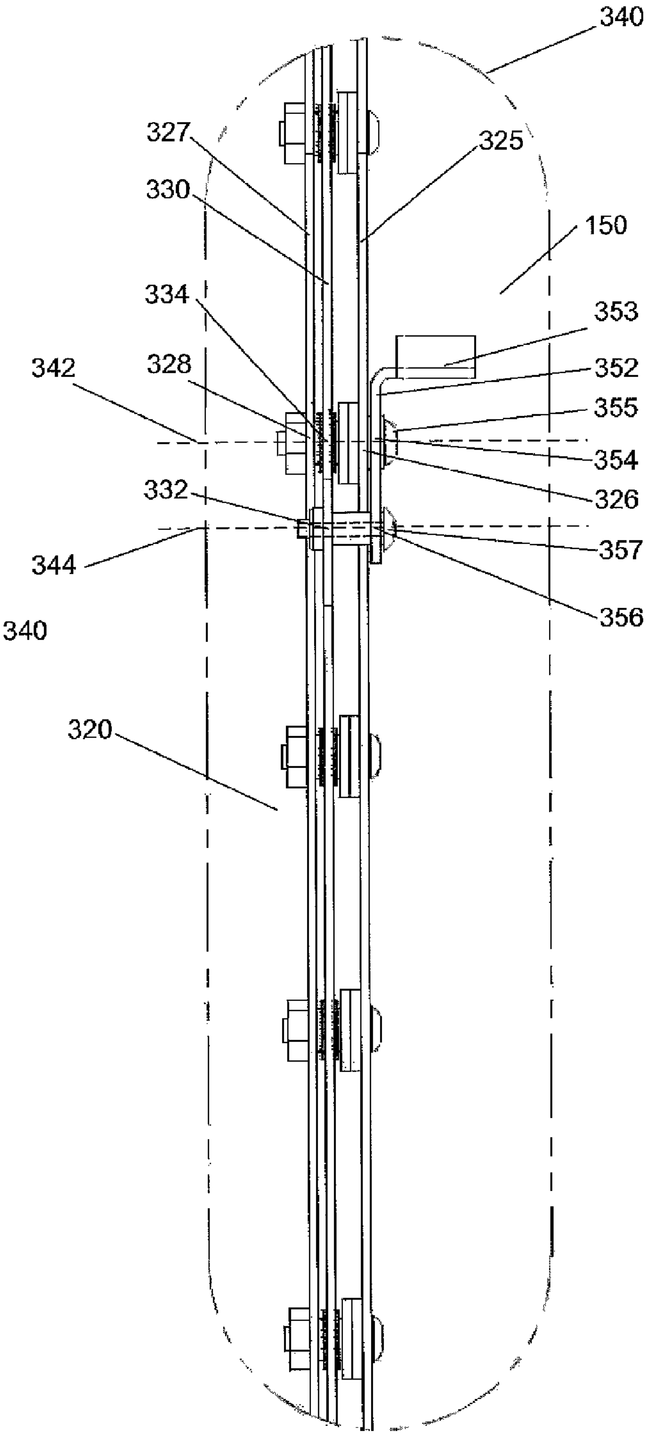
FIG. 3C is a diagram illustrating another front view of the exemplary actuator of FIG. 3A.

Referring now to FIG. 3B and FIG. 3C, diagrams are shown illustrating a front view of the exemplary actuator 130*a* in accordance with the actuator assembly 100 of FIG. 1. FIG. 3C shows an enlarged view of section 340 of FIG. 3B. The actuator housing 320 further comprises a first elongated section 325 and a second elongated section 327. The first elongated section 325 includes one or more holes labeled generally as 326 for coupling each of the one or more cams 150 to the actuator housing 320. The second elongated section 327 also includes one or more holes 328 for coupling each of the one or more cams 150 to the actuator housing. The holes 326 and 328 are positioned in pairs, each pair forming an axis, such as the axis labeled as 342, about which one of the cams 150 rotates. The attachment mechanism 355 may be inserted through the circular cutout section 354 of the cam 150 and through one of the pairs of holes 326 and 328 along axis 342 to rotatably couple the cam 150 to the actuator housing 320. The slider component 330 includes one or more slot-shaped cutouts labeled as 334 through which the attachment mechanism 355 also passes. The cutout 334 is slot-shaped to allow the slider component 330 to slide in a vertical direction relative to the elongated sections 325 and 327 of the actuator housing 320. The slider component 330 also includes one or more circular cutouts 332. The circular cutouts 332 of the slider component 330 are aligned with the slot-shaped cutout 356 of the cam body 352 along an axis labeled as 344. The attachment mechanism 357 may be inserted through the circular cutout 332 of the slider component 330 and the slot-shaped cutout 356 of the cam body 352 along axis 344 to rotatably and slidably couple the cam 150 to the slider component 330. By way of example only, the attachment mechanisms 355 and 357 may be bolts and may also include hex-shaped nuts as well as spacer components such as washers to provide adequate spacing to keep the elongated sections 325 and 327, the slider component 330 and the cam body 352 in parallel alignment. As shown, the cam 150 is in a disengaged state in which the contact section 353 of the cam body 352 is perpendicular to a front face of the control panel (not shown). The contact section 353 of the cam body 352 minimally obstructs an operator's view of the front face of the control panel while in the disengaged state. In particular, the contact section 353 of the cam body 352 minimally obstructs an operator's view of a particular button or switch located on the front face of the control panel which the cam 150 is responsible for pressing. Many control panel control components such as buttons and switches may change state during operation. By way of example only, a control panel button may change state by changing color or by displaying different alphanumeric symbols. By providing minimal obstruction of the view of the control panel the exemplary actuator assembly 100 advantageously improves an operator's ability to see and react to these changes in button or switch states during operation.

Figure 4B:
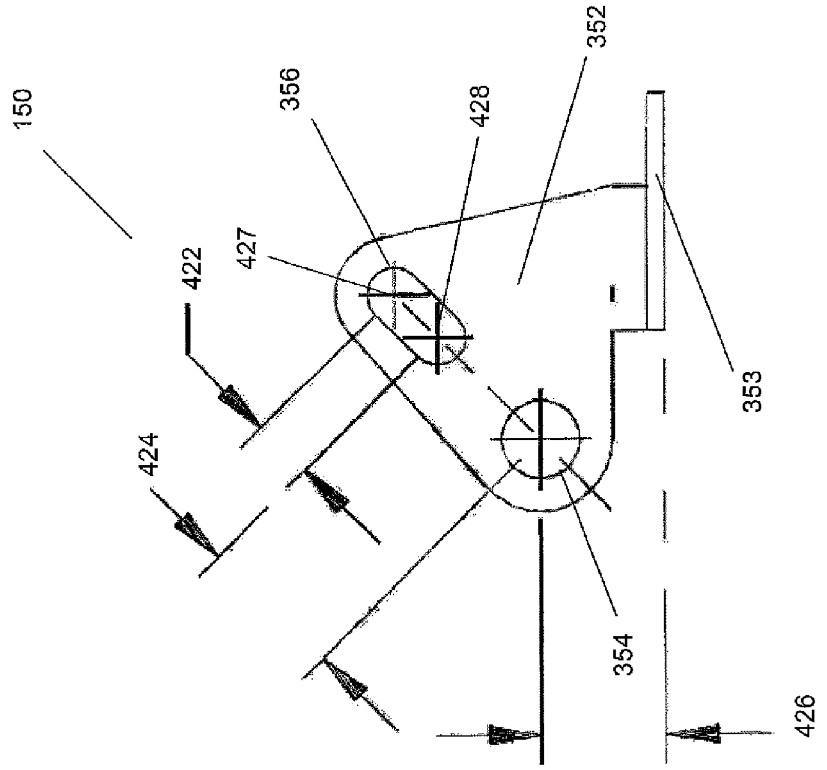
FIG. 4B is a diagram illustrating a side view of the exemplary cam of FIG. 4A.
Figure 4A:
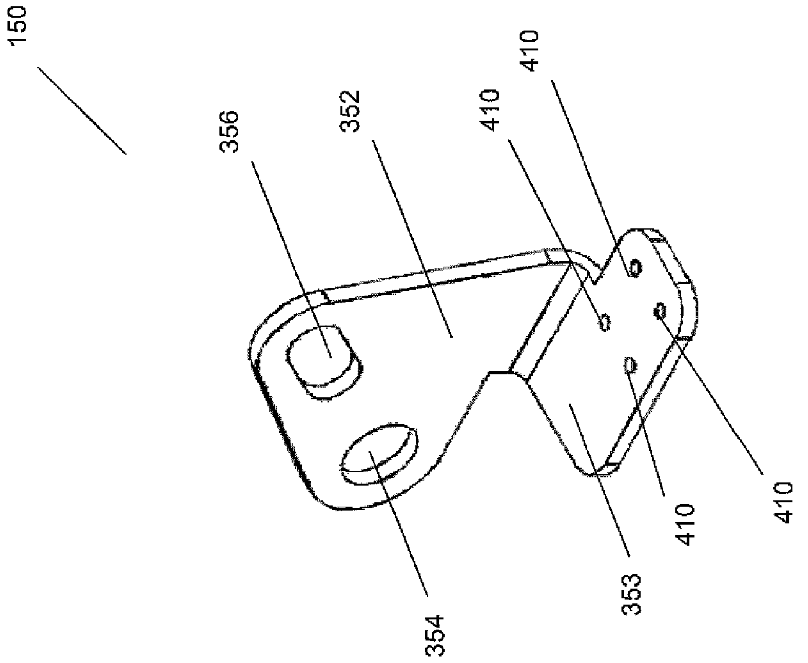
FIG. 4A is a diagram illustrating an isometric view of a cam in accordance with the exemplary actuator assembly of FIG. 1.

Referring now to FIG. 4A a diagram is shown illustrating an isometric view of a cam 150 in accordance with the actuator assembly 100 of FIG. 1. As shown, the contact section 353 of the cam body 352 may also include a plurality of holes labeled generally as 410. By way of example, a synthetic polymer thread (not shown) such as Nylon thread may be threaded through each of the holes 410 and the cam padding 358 (shown in FIG. 3A) to attach the cam padding 358 to the contact section 353 of the cam body 352. The use of synthetic polymer threading such as Nylon threading avoids thermal expansion that can occur with use of other attachment mechanisms such as glue in extremely low and high temperature environments. Avoiding thermal expansion advantageously reduces variation in button impact depth in different environmental conditions. The use of synthetic polymer threading also provides a means for easily replacing the cam padding 358. In order to precisely control the button impact depth cam paddings of different thicknesses may be used. The use of polymer threading to attach the cam paddings allows the cam paddings to be easily interchanged. By way of example only, the cam padding 358 may be a wool padding. Use of a cam padding 358 advantageously cushions the buttons or switches on the control panel when the contact section 353 of the cam body 352 engages the control panel and allows the button impact depth to be controlled. The use of wool as the material for the cam padding 358 provides better longevity for the cam padding 358 in the low and high temperature environments (e.g., from −25 degrees Celsius to +55 degrees Celsius) as well as high humidity environments (e.g. about 90% humidity) that the contemplated actuator assembly 100 may operate in.

Referring now to FIG. 4B, a diagram is shown illustrating a side view of a cam 150 in accordance with the actuator assembly 100 of FIG. 1. As discussed, the cam body 352 includes the slot-shaped cutout 356 and the circular cutout 354. The slot-shaped cutout 356 is shaped to allow the exemplary cam 150 to rotate about the axis 342 (shown in FIG. 3C) in response to an axial motion imparted on the slider component 330 by the drive mechanism 310. The slot-shaped cutout 356 has a length labeled as 422. By way of example only the length 422 may be 0.21 inches. The circular cutout 354 is positioned such that a center of the circular cutout 354 is located at a distance labeled as 424 from a center point of a first end of the slot-shaped cutout 356. The distance 424 may be approximately 0.5 inches. When the cam is in the disengaged state, the axis 344 (shown in FIG. 3C) is located in a first position labeled as 427. When the cam is in the engaged state, the axis 344 (shown in FIG. 3C) is located at a second position labeled as 428. The length 422 of the slot-shaped cutout 356 and the distance 424 together determine the range of rotational motion that the cam 150 travels in response to the axial motion imparted by the drive mechanism 310. The length 422 of the slot-shaped cutout 356 and the distance 424 also determine the angular velocity at which the cam 150 rotates relative to the linear velocity of the drive mechanism 310. In this manner, the angular velocity of the contact section 353 measured at impact with a control panel button can be accurately controlled. In particular, since it is known that the axis 344 will be located at distance 424 when the cam 150 is in the engaged state and the force of the linear drive component 310 is also known, the force that the contact section 353 of the cam 150 exerts on a control panel button or switch may be determined. The distances 422 and 424 or the linear drive mechanism 310 may be adjusted to precisely control the force that the contact section 353 of the cam 150 exerts when in the engaged state, advantageously preventing damage to the control panel. The circular cutout 354 is also positioned at a sufficient offset distance 426 from the contact section 353 of the cam body 352 to allow the cam 150 to press a button on the control panel to which the actuator assembly 100 is mounted. By way of example only, the offset distance may be approximately 0.43 inches.

Figure 5:
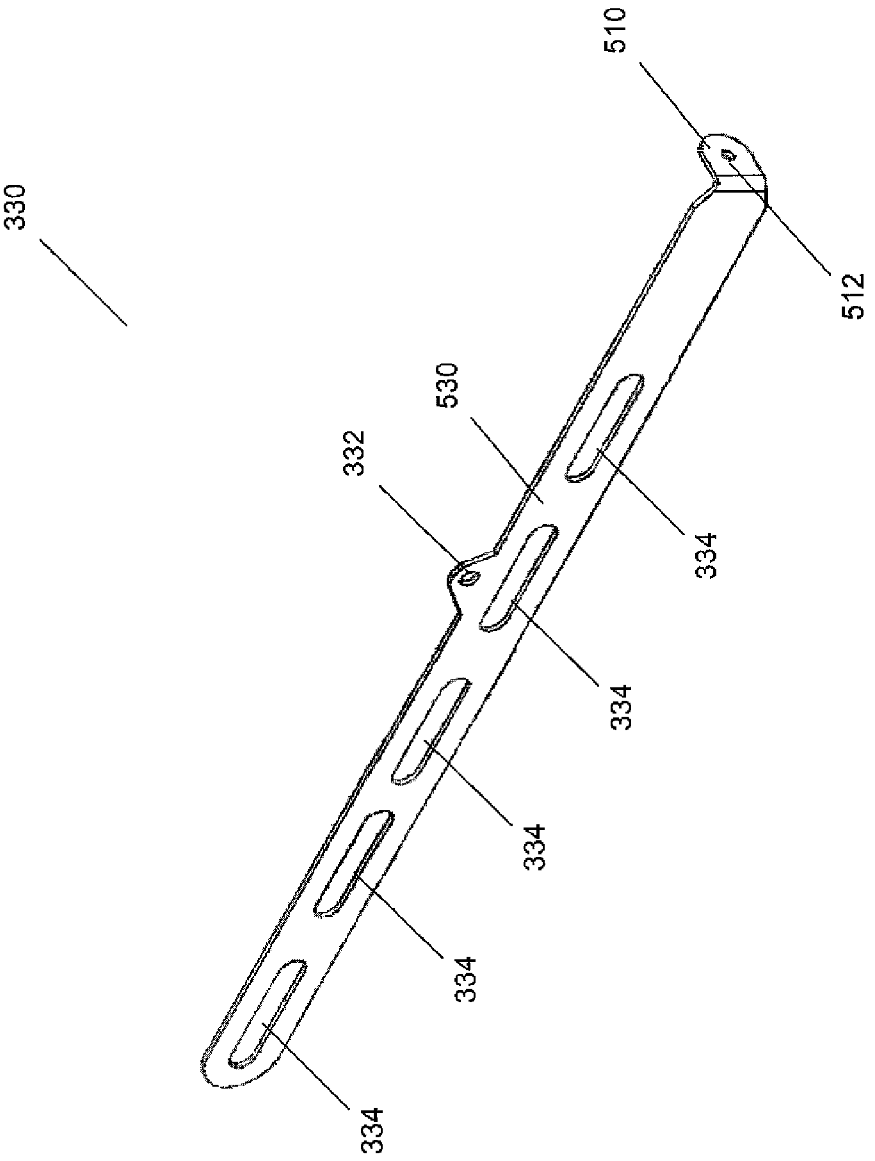
FIG. 5 is a diagram illustrating an isometric view of a slider in accordance with the exemplary actuator assembly of FIG. 1.

Referring now to FIG. 5, a diagram is shown illustrating an isometric view of an exemplary slider component 330 in accordance with the actuator assembly 100 of FIG. 1. As discussed, the slider component 330 includes the slot-shaped cutouts 334 for allowing the slider component 330 to move freely relative to the elongated sections 325 and 327 of the actuator housing 320. The slider component 330 also includes the circular cutout 332 for coupling the cam 150 to the slider. The slider component 330 also includes a coupling section 510. The coupling section 510 has a circular cutout section 512 for receiving the screw 323 that couples the slider component 330 to the drive mechanism 310. The cutout section 510 is formed perpendicular to an elongated section 530 of the slider component 330 so that the drive mechanism 310 may impart an axial motion to the elongated section 530 of the slider component 330.

Figure 6:
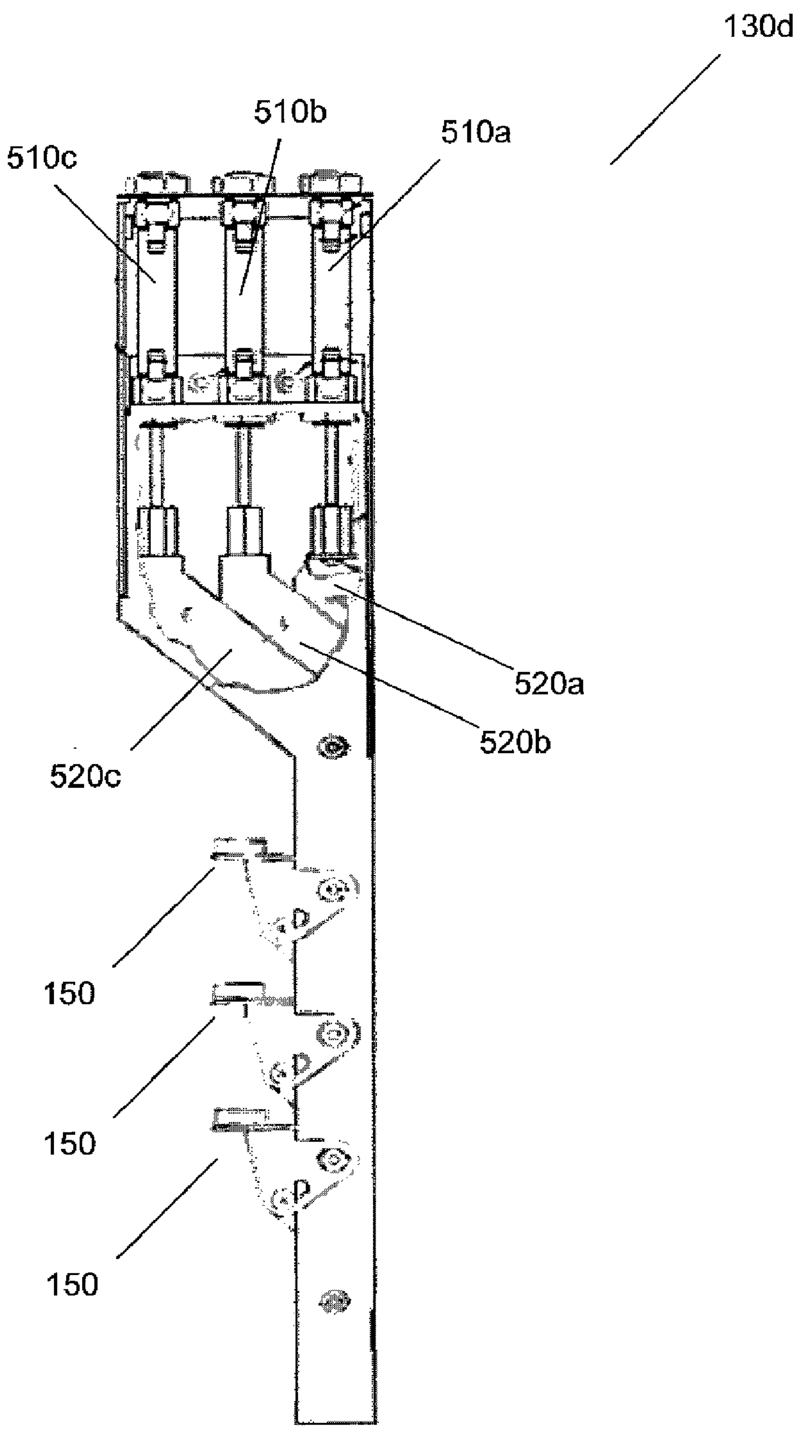
FIG. 6 is a diagram of another actuator in accordance with the exemplary actuator assembly of FIG. 1.

Referring now to FIG. 6, a diagram is shown illustrating a side view of another exemplary actuator 130*d* in accordance with the actuator assembly 100 of FIG. 1. As shown, the exemplary actuator 130*d* includes three drive mechanisms 510*a*, 510*b* and 510*c*. The exemplary actuator 130*d* also includes three slider mechanisms labeled as 520*a*, 520*b* and 520*c*. Each of the sliders 520*a*, 520*b* and 520*c* is coupled to one of the drive mechanisms 510*a*, 510*b* and 510*c* respectively. The exemplary actuator 130*d* also includes three cams 150. Each of the cams 150 is rotationally coupled to one of the sliders 520*a*, 520*b* and 520*c*. In this manner, each of the cams 150 may be independently actuated by one of the drive mechanisms 510*a*, 510*b* and 510*c* to press a button or switch on control panel to which the actuator assembly 100 is mounted.

Thus, an actuator assembly is contemplated having the benefit of remote actuation of a control panel while minimally obstructing an operator's view of the control panel. An actuator assembly for remote control panel button or switch actuation is contemplated having one or more remotely controllable linear drive mechanisms for imparting a rotational motion on one or more cams to remotely press a button or switch. While disengaged the cams are rotated to a position where they minimally obstruct an operator's view. The contemplated actuator assembly also allows the force of actuation to be accurately controlled.

While the foregoing invention has been described with reference to the above-described embodiments, various modifications and changes can be made without departing from the spirit of the invention. Accordingly, all such modifications and changes are considered to be within the scope of the appended claims.

What is claimed is:

1. An actuator for actuating a control component on a control panel comprising:

an actuator body having one or more fixed elongated sections;

an elongated slider component parallel to the one or more fixed elongated sections;

a cam component rotatably coupled to one or more of said one or more fixed elongated sections and slidably coupled to said elongated slider component;

a drive mechanism coupled to said actuator body and to said slider component, said drive mechanism adapted to impart axial motion on said elongated slider component; wherein said cam component is adapted to rotatably engage said control panel control component in response to said axial motion of said slider component.

2. The actuator of claim 1, wherein said cam component further comprises:

a slot-shaped cutout section for slidably coupling said cam component to said elongated slider component;

a circular cutout section for rotatably coupling said cam component to one or more of said one or more fixed elongated sections;

a contact section for contacting said control panel control component.

3. The actuator of claim 2, wherein said actuator further comprises:

a pad mounted to said contact section of said cam component for protecting said control panel control component.

4. The actuator of claim 3, wherein said pad is a wool pad.

5. The actuator of claim 3, wherein said cam component further comprises:

one or more holes disposed on said contact section; and synthetic polymer threading for mounting said pad to said contact section, said synthetic polymer threading being threaded through said one or more holes on said contact section.

6. The actuator of claim 2, wherein said circular cutout section of said cam component is located a distance from said slot-shaped cutout section to actuate said control panel control component, the circular cutout section and slot-shaped cutout section forming a first major surface of said cam component, and the contact section forming a second major surface of said cam component orthogonal to said first major surface.

7. The actuator of claim 1, wherein said drive mechanism is a pneumatic drive mechanism.

8. The actuator of claim 7, wherein said drive mechanism is adapted to receive remote operating instructions.

9. An actuator for actuating a control component on a control panel comprising:

an actuator body having one or more fixed elongated sections;

an elongated slider component proximately parallel to the one or more fixed elongated sections;

a cam component rotatably coupled to one or more of said one or more fixed elongated sections and slidably coupled to said elongated slider component, the cam component including a contact section for contacting said control panel control component, the contact section including one or more holes disposed on said contact section; and synthetic polymer threading for mounting a pad to said contact section for protecting said control panel control component, said synthetic polymer threading being threaded through said one or more holes on said contact section; and a drive mechanism coupled to said actuator body and to said slider component, said drive mechanism adapted to impart axial motion on said elongated slider component;

wherein said cam component is adapted to rotatably engage said control panel control component in response to said axial motion of said slider component.

10. The actuator of claim 9, wherein said cam component further comprises:

a slot-shaped cutout section for slidably coupling said cam component to said elongated slider component; and a circular cutout section for rotatably coupling said cam component to one or more of said one or more fixed elongated sections.

11. The actuator of claim 9, wherein said pad is a wool pad.

12. The actuator of claim 9, wherein said circular cutout section of said cam component is positioned relative to said slot-shaped cutout section to actuate said control panel control component, the circular cutout section and slot-shaped cutout section forming a first major surface of said cam component, and the contact section forming a second major surface of said cam component orthogonal to said first major surface.

* * * * *

UNITED STATES PATENT AND TRADEMARK OFFICE

CERTIFICATE OF CORRECTION

PATENT NO. : 8,286,521 B2
APPLICATION NO. : 12/411465
DATED : October 16, 2012
INVENTOR(S) : Timothy C. McIlroy and David J. Carta It is certified that error appears in the above-identified patent and that said Letters Patent is hereby corrected as shown below:

Title Page:

In Inventors Section (75) please add "James W. Sutliff, deceased, late of Cold Brook (NY); by Talia Sutliff, legal representative, Rome (NY)"

Signed and Sealed this
Second Day of July, 2013

Teresa Stanek Rea
*Acting Director of the United States Patent and Trademark Office*